US012323759B2

(12) United States Patent
O'Brien, Sr.

(10) Patent No.: US 12,323,759 B2
(45) Date of Patent: Jun. 3, 2025

(54) ELLIPTICAL RING RADIATOR DIAPHRAGM, TWEETER AND DAMPING METHOD

(71) Applicant: Polk Audio, LLC, Vista, CA (US)

(72) Inventor: Sean O'Brien, Sr., Harwood, MD (US)

(73) Assignee: Polk Audio, LLC, Vista, CA (US)

( * ) Notice: Subject to any disclaimer, the term of this patent is extended or adjusted under 35 U.S.C. 154(b) by 0 days.

(21) Appl. No.: 18/423,594

(22) Filed: Jan. 26, 2024

(65) Prior Publication Data

US 2024/0171900 A1 May 23, 2024

Related U.S. Application Data

(63) Continuation of application No. 17/431,126, filed as application No. PCT/US2020/018093 on Feb. 13, 2020, now Pat. No. 11,889,258.

(Continued)

(51) Int. Cl.
*H04R 1/24* (2006.01)
*H04R 1/34* (2006.01)
(Continued)

(52) U.S. Cl.
CPC ............... *H04R 1/24* (2013.01); *H04R 1/345* (2013.01); *H04R 7/127* (2013.01); *H04R 7/18* (2013.01);
(Continued)

(58) Field of Classification Search
CPC .......... H04R 1/24; H04R 1/345; H04R 7/127; H04R 7/18; H04R 9/025; H04R 9/045; H04R 9/06; H04R 2400/11
See application file for complete search history.

(56) References Cited

U.S. PATENT DOCUMENTS 4,413,162 A 1/1983 Lumsden et al.
6,320,972 B1 * 11/2001 Goller ...................... H04R 7/12 381/430

(Continued)

FOREIGN PATENT DOCUMENTS

JP 2010-278793 12/2010
JP 2010278793 A * 12/2010

OTHER PUBLICATIONS

International Search Report for PCT/US2020/018093 dated Apr. 29, 2020, pp. 1-2.

(Continued)

*Primary Examiner* — Sunita Joshi
(74) *Attorney, Agent, or Firm* — Knobbe, Martens, Olson & Bear, LLP

(57) ABSTRACT

A loudspeaker driver or tweeter (e.g., 100, 200 or 300) having a voice coil connected with a loudspeaker diaphragm (e.g., 106, 206 or 306), having a substantially circular diaphragm portion which is connected with or rests upon a voice coil attachment segment (e.g., 104, 204, 304). The diaphragm also includes a first central elliptical (non-circular-shaped) inner roll portion (e.g., 112, 212, 312) defining a central recessed area and a second, outer elliptical (non-circular-shaped) roll portion (e.g., 108, 208, 308) so the central portion and the outer roll portion that have substantially elliptical edge circumferences with substantially circular central peripheral edges to define diaphragm segments with a varying radial Chord lengths having non-uniform diameter dimensions (inside diameter to outside diameter) and when in use, the excursion of the diaphragm is controlled such that any breakup modes are minimized and the associated resonances are minimized.

3 Claims, 10 Drawing Sheets

Related U.S. Application Data

(60) Provisional application No. 62/805,044, filed on Feb. 13, 2019.

(51) Int. Cl.

| | |
|---|---|
| ***H04R 7/12*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ............ *H04R 9/025* (2013.01); *H04R 9/045* (2013.01); *H04R 9/06* (2013.01); *H04R 2400/11* (2013.01)

(56) References Cited

U.S. PATENT DOCUMENTS

| | | | | |
|---|---|---|---|---|
| 8,638,968 | B2 | 1/2014 | Gladwin | |
| 9,282,410 | B2 | 3/2016 | Gladwin et al. | |
| 9,538,268 | B2 | 1/2017 | Gladwin et al. | |
| 2004/0195039 | A1 * | 10/2004 | Sahyoun ................ | H04R 7/122 181/157 |
| 2007/0209866 | A1 | 9/2007 | Frasl et al. | |
| 2011/0129113 | A1 | 6/2011 | Kumakura et al. | |
| 2013/0233640 | A1 | 9/2013 | Humphreys et al. | |
| 2018/0317015 | A1 | 11/2018 | Bellas | |
| 2022/0150618 | A1 | 5/2022 | O'Brien, Sr. | |
| 2022/0329946 | A1 | 10/2022 | O'Brien et al. | |

OTHER PUBLICATIONS

International Preliminary Report on Patentability for PCT/US2020/018093 dated Aug. 10, 2021, pp. 1-9.

* cited by examiner

ELLIPTICAL RING RADIATOR DIAPHRAGM, TWEETER AND DAMPING METHOD

BACKGROUND OF THE INVENTION

This application is a continuation of U.S. application Ser. No. 17/431,126 filed Aug. 13, 2021, now U.S. Pat. No. 11,889,258 issued Jan. 30, 2024, which is a Section 371 application of International Application No. PCT/US20/18093 filed Feb. 13, 2020, which claims priority to related, commonly owned U.S. provisional patent application No. 62/805,044 filed Feb. 13, 2019, the entire disclosures of which are incorporated herein by reference. This application is also broadly related to commonly owned U.S. Pat. Nos. 4,413,162, 8,638,968, 9,282,410 and 9,538,268, the entire disclosures of which are also incorporated herein by reference.

FIELD OF THE INVENTION

The present invention relates to loudspeakers and more particularly to high frequency loudspeaker drivers often referred to as Tweeters.

DISCUSSION OF THE PRIOR ART

High fidelity loudspeaker systems often include two or more loudspeaker drivers each with a specialized frequency range. Drivers intended for use in the upper frequency range (e.g. 2 KHz to 20 KHz) are typically referred to as "tweeters", and high performance or high fidelity tweeters have undergone significant enhancements where "ring radiator" tweeters have become particularly popular in high fidelity loudspeaker manufacturing. An early example of a ring radiator tweeter is Lars Goller's tweeter (illustrated in U.S. Pat. No. 6,320,972) which was made and sold by the Vifa company, among others. The basic design of ring radiator tweeters is well known to provide a wide bandwidth and smooth frequency responses due in part to its low fundamental resonance and low moving mass. Referring now to FIGS. 1A-1C, like any moving-coil loudspeaker, a Ring radiator tweeter has a diaphragm (i.e., ring dome 12) driven by a voice coil 4 riding in a magnetic gap between two poles. Across the poles there is magnetic flux, which causes the voice coil, when energized, to move axially in response to current in the coil from an input signal. The voice coil is attached to the ring dome diaphragm 12 and moves the ring diaphragm 12 to reciprocate axially along the voice coil's central axis. In the case of a ring radiator, the inner and outer rolls of the ring suspend and center the diaphragm so it may reciprocate with the voice coil, causing the necessary air displacement (compressions and rarefactions) to generate sound.

The prior art ring radiator loudspeaker configuration is not entirely ideal, however. A cross section of the rolls (e.g. as shown in FIG. 1A (from Danish Patent Appl. No. 1162/85) and 1B) show that the diameter dimensions (inside diameter to outside diameter) of the rolls do not vary, where the rolls have a uniform cross section over the entire annular structure. The fact that each of the inner and outer rolls (12 and 8) are substantially constant in cross section and constant in diameter dimensions (inside diameter to outside diameter) over the entire annular sweep of each ring allows for development of strong resonant modes that can affect the tweeter's sound, adversely affecting the smoothness of the frequency response (e.g., as shown in FIGS. 1C and 1D).

What is needed, then, is a tweeter diaphragm and suspension structure and method which provide the benefits of the ring radiator tweeter without undesirable resonance-induced sound quality problems.

SUMMARY

The purpose of the present invention is to overcome the undesirable resonance-induced sound quality problems by providing an improved ring radiator tweeter structure and method.

When the diaphragm suspension's inner and outer edges are circular and axially aligned with the voice coil (e.g., as in the Prior Art of FIGS. 1A, 1B and 1D), the diameter dimensions (inside diameter to outside diameter) or radial distance from the edges to the voice coil is constant around the diaphragm. Put another way, if the diameter dimension (inside diameter to outside diameter) is depicted as a radial line or Chord transecting the diaphragm suspension, for the annular shapes of FIGS. 1A, 1B and 1D, the radial Chord length is constant around all of the diaphragm, and so, during use, a single strong resonant mode will develop which corresponds to that uniform radial Chord length (e.g., as illustrated in FIG. 1D). There is a narrow spectral range of frequencies with wavelengths that "fit" in this radial Chord length dimension, leading to the strong resonance modes that have created the sound problems identified above. For each standard ring radiator diaphragm configuration (e.g., FIGS. 1A, 1B and 1D), the instant applicant's work has confirmed that there are only a few very strong "eigenmodes" for that diaphragm configuration which create the resonant modes.

The applicant has studied whether a similar resonance mechanism is also present if one were to use an elliptical central opening, a circular voice coil and an elliptical outside circumferential edge, where the elliptical central opening and elliptical outer circumferential edge have a similar ratio of major to minor axes, thereby providing a varying radial Chord length as one proceeds around the driver diaphragm's suspension. It was discovered that by using an elliptical path to define the edges and a circular voice coil for the rolls to follow, the radial Chord length distance (from the voice coil to the inner and outer edges of each roll) varies around the diaphragm. This variation in distances means that no single frequency will define a wavelength that ideally matches the distance around the entire roll, and rather, only a small portion of each diaphragm will be likely to resonate at any given frequency. By having an elliptical outer periphery but a circular inner periphery holding the voice coil former, the driver diaphragm's radial Chord length varies and as a result problematic eigenmodes are suppressed and instead a larger number of much weaker resonant modes may remain. This tradeoff is a benefit because strong resonant modes cause significant problems in the perceived frequency response, whereas weak resonant modes cause what are comparatively very minor problems, many of which are below the threshold of hearing. Therefore, the applicant has discovered that it is better to have a plurality of weak modes (due to the novel structure of the present invention) than the few large eigenmodes which are more easily perceived by listeners when using tweeter structures of the prior art.

In an alternative embodiment, the cross sectional profile or height of the roll may vary to provide something of a corrugated or turbine like appearance as one views the roll in its entire sweep around the diaphragm. By varying the heights of the rolls as they sweep around the diaphragm it is insured that the arc-length of the rolls (as opposed to the radial distance or radial Chord length) is similar to insure that the excursion potential of the rolls is not adversely affected, and thus is substantial to the same as the excursion potential of a hemispherical roll (as in the prior art). By adding variations to the cross-sectional height or profile of the roll at different places around the diaphragm, applicant has insured that there are no stiff spots where the rolls are stiffer in some sections of the roll than others which could lead to an unbalanced motion of the voice coil and diaphragm during the linear excursion. This variation in height can also suppress resonances that can arise from a uniform or consistent geometry of the rolls, providing a similar reduction in the magnitude of modes by increasing their number. In yet another embodiment, the circle of the voice coil and the ellipses that define the rolls do not share a common central axis. By offsetting the axes of the voice coil former (which is circular) and the elliptical rolls, yet another asymmetry is provided which prevents the creation of strong resonances.

DETAILED DESCRIPTION

Figure 1A:
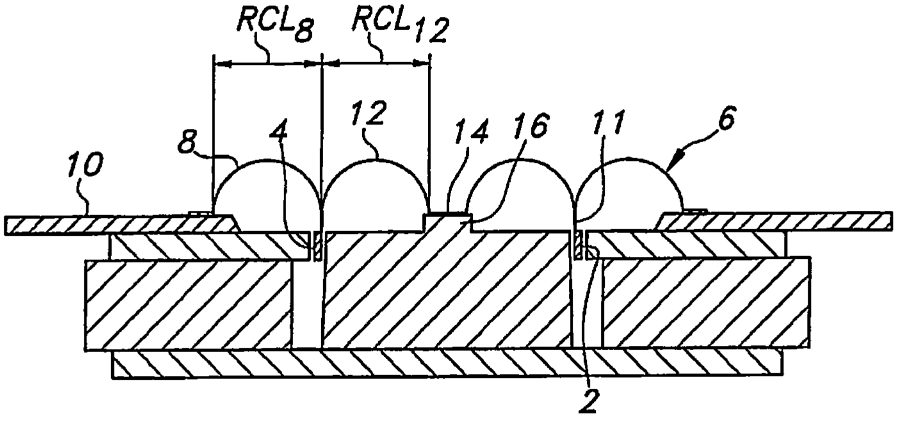
FIG. 1A (PRIOR ART)
FIGS. 1A-1C illustrate features of a traditional Ring Radiator Tweeter (e.g., as illustrated in U.S. Pat. No. 6,320,971) and provide an exemplary plot of its frequency response performance, in accordance with the Prior Art.
Figure 1B:
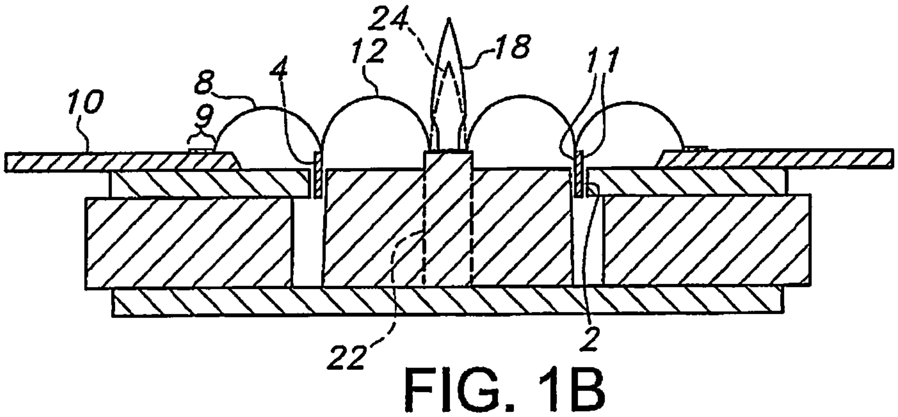
FIG. 1B (PRIOR ART)
Figure 1C:
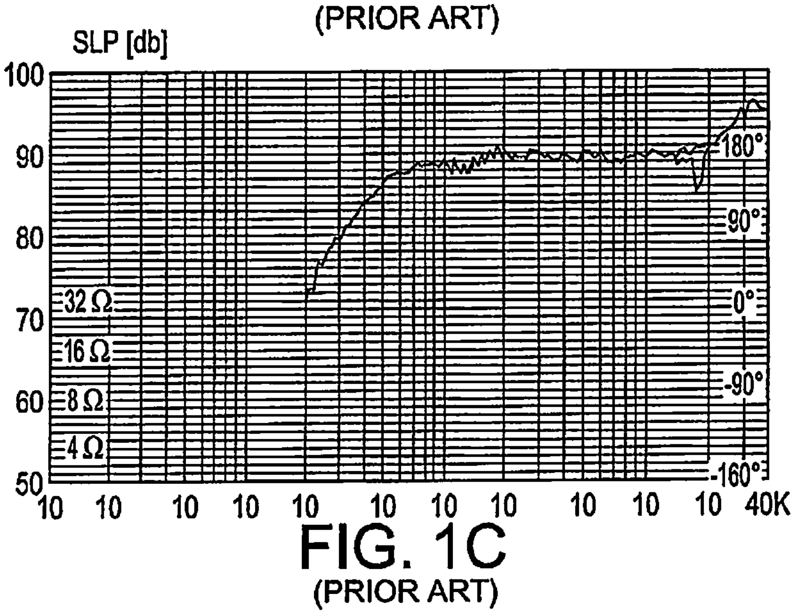
FIG. 1C (PRIOR ART)

Referring next to FIGS. 2A-4B, in accordance with the present invention, a tweeter (e.g., 100, 200 or 300) having a non-annular diaphragm or radiating part is driven by a relatively conventional moving-coil driver motor where the voice coil (e.g., 104, 204 or 304) is formed on a substantially cylindrical former and situated in an air gap which focuses magnetic flux (as shown in FIGS. 1A and 1B). The driving signal current flowing to the voice coil causes the coil to move along the voice coil former central axis inwardly and outwardly to provide the tweeter's vibratory motion which is translated to the diaphragm and the diaphragm's motion is coupled to the air to produce the tweeter sound.

Figure 1D:
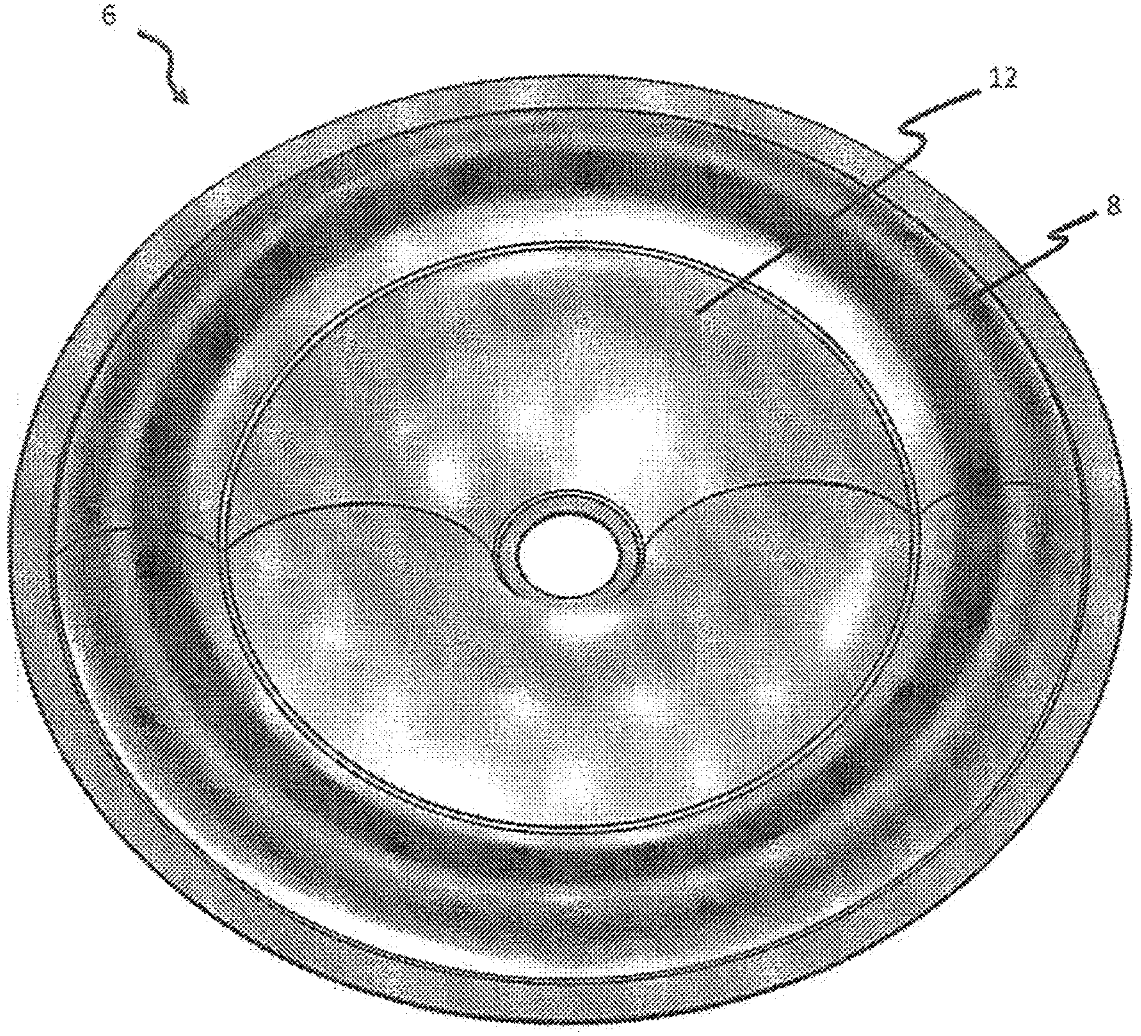
FIG. 1D is a perspective view of a modelling simulation result illustrating the undesired strong eigenmodes in the traditional Ring Radiator Tweeter of FIGS. 1A-1C (i.e., having a uniform diaphragm suspension radial Chord length) and provides an exemplary view in uniform gray around the circumference of the diaphragm which shows a strong or dominant mode that involves the entire diaphragm, in accordance with applicant's observations of the Prior Art driver and diaphragm.
Figure 2A:
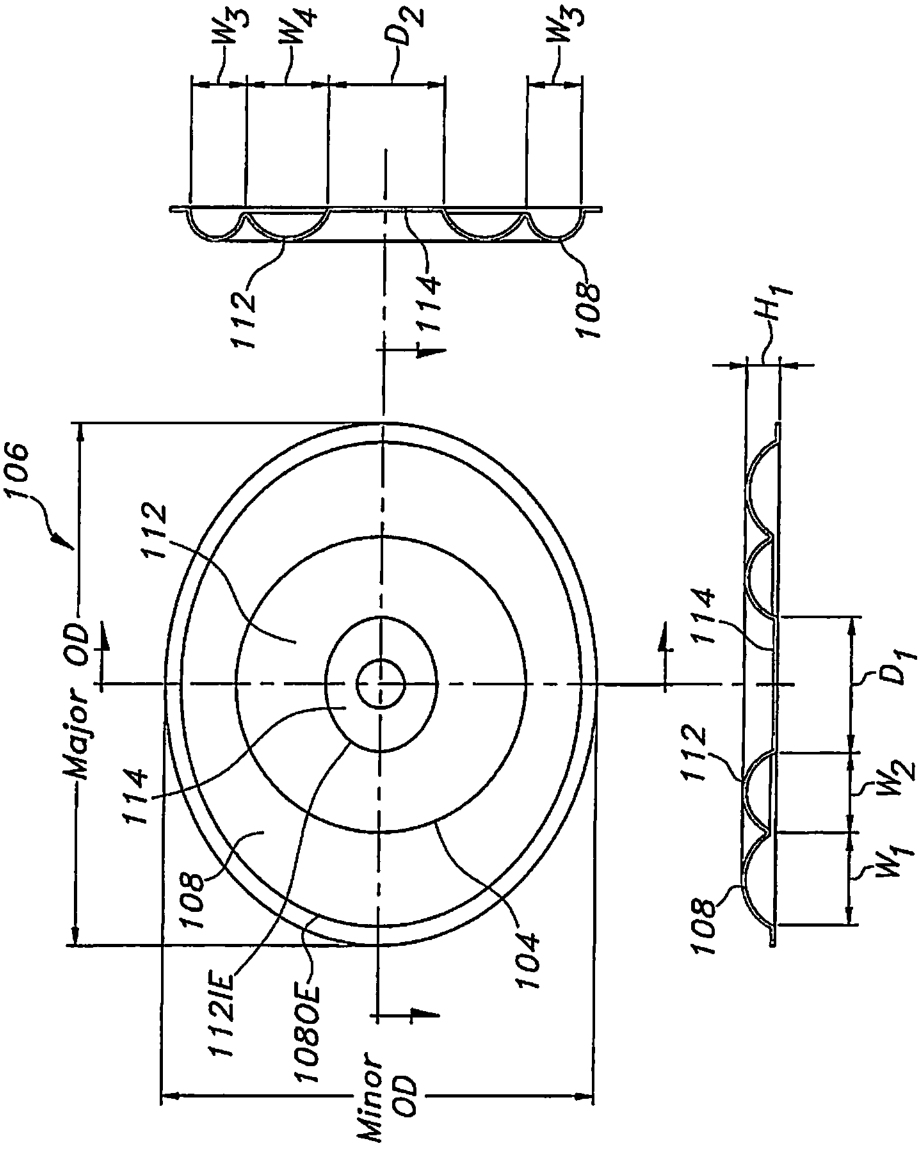
FIGS. 2A and 2B illustrate an embodiment of an Elliptical Ring Radiator Tweeter driver and diaphragm with an elliptical central opening, a circular voice coil attachment and an elliptical outside circumferential edge, where the elliptical central opening and elliptical outer circumferential edge have a similar ratio of major to minor axes, thereby providing a varying radial Chord length as one proceeds around the driver diaphragm's suspension with rolls of constant height, in accordance with the present invention.
Figure 2B:
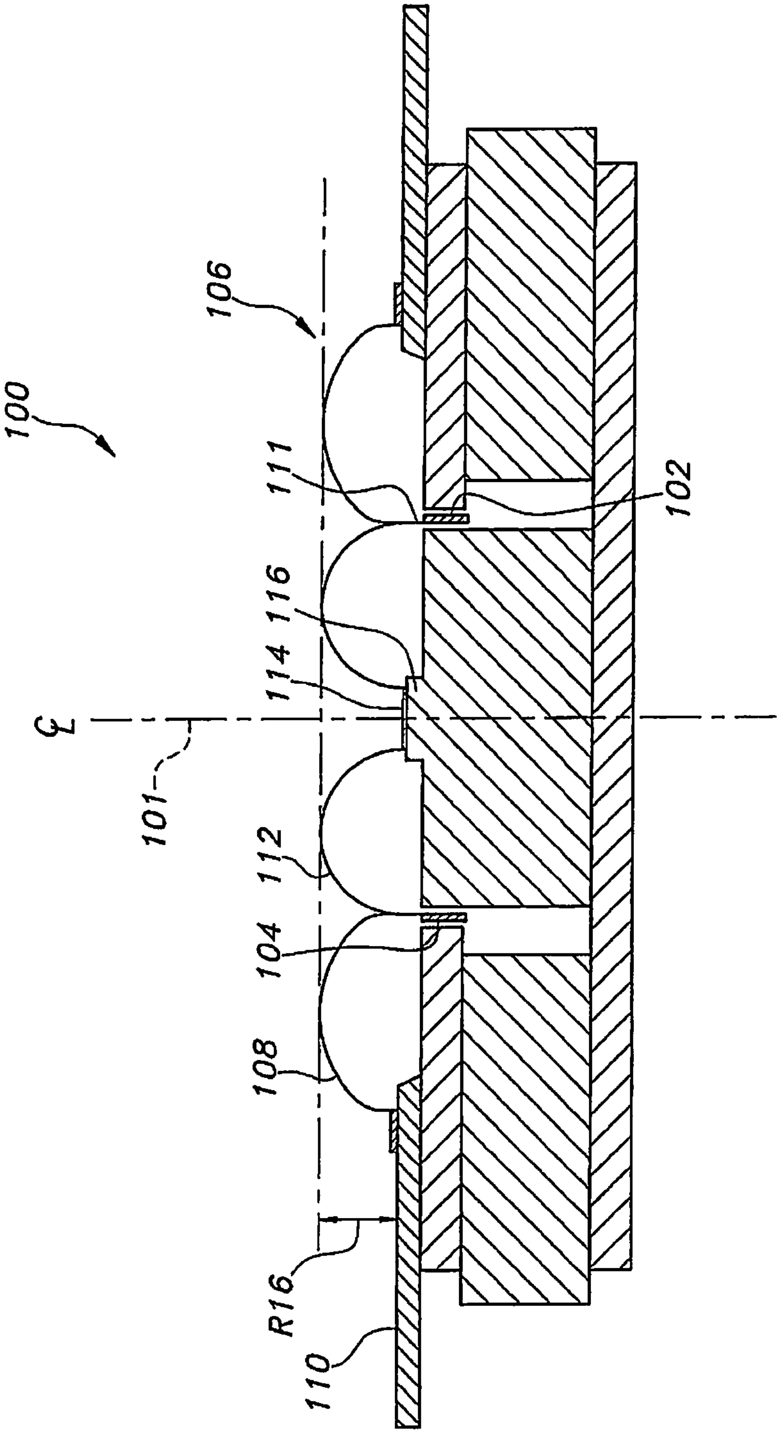

As noted above, the prior art versions of the ring radiator tweeter (as shown in U.S. Pat. No. 6,320,972 and FIGS. 1A and 1B) are axis-symmetric meaning the cross sections and Radial Chord Lengths ($RCL_8$ or $RCL_{12}$) of the diaphragm segments 8 and 12 do not change or vary substantially as one sweeps around the central axis of the diaphragm segments (e.g., as best seen in FIGS. 1A and 1D). The prior art ring radiator tweeter's axis-symmetric geometry (with substantially constant Radial Chord Lengths $RCL_8$ and $RCL_{12}$) was discovered to lead to sound quality problems arising from fundamental resonances, as described above. In accordance with the method and structure of the present invention, the elliptical ring radiator tweeter diaphragm with varying radial Chord lengths (e.g., as illustrated in FIGS. 2A and 2B) provide diaphragm segments or rolls 108, 112 which are substantially circular at their edges where they meet in the central portion which attaches to the voice coil former (at 104) but are elliptical at the inner edge 112IE and outer edge 108OE, thereby providing a non axis-symmetric cross sections (as best seen in the projections of FIG. 2A. More specifically, the rolls of the diaphragm segments 108, 112 are not axis-symmetric.

Figure 2C:
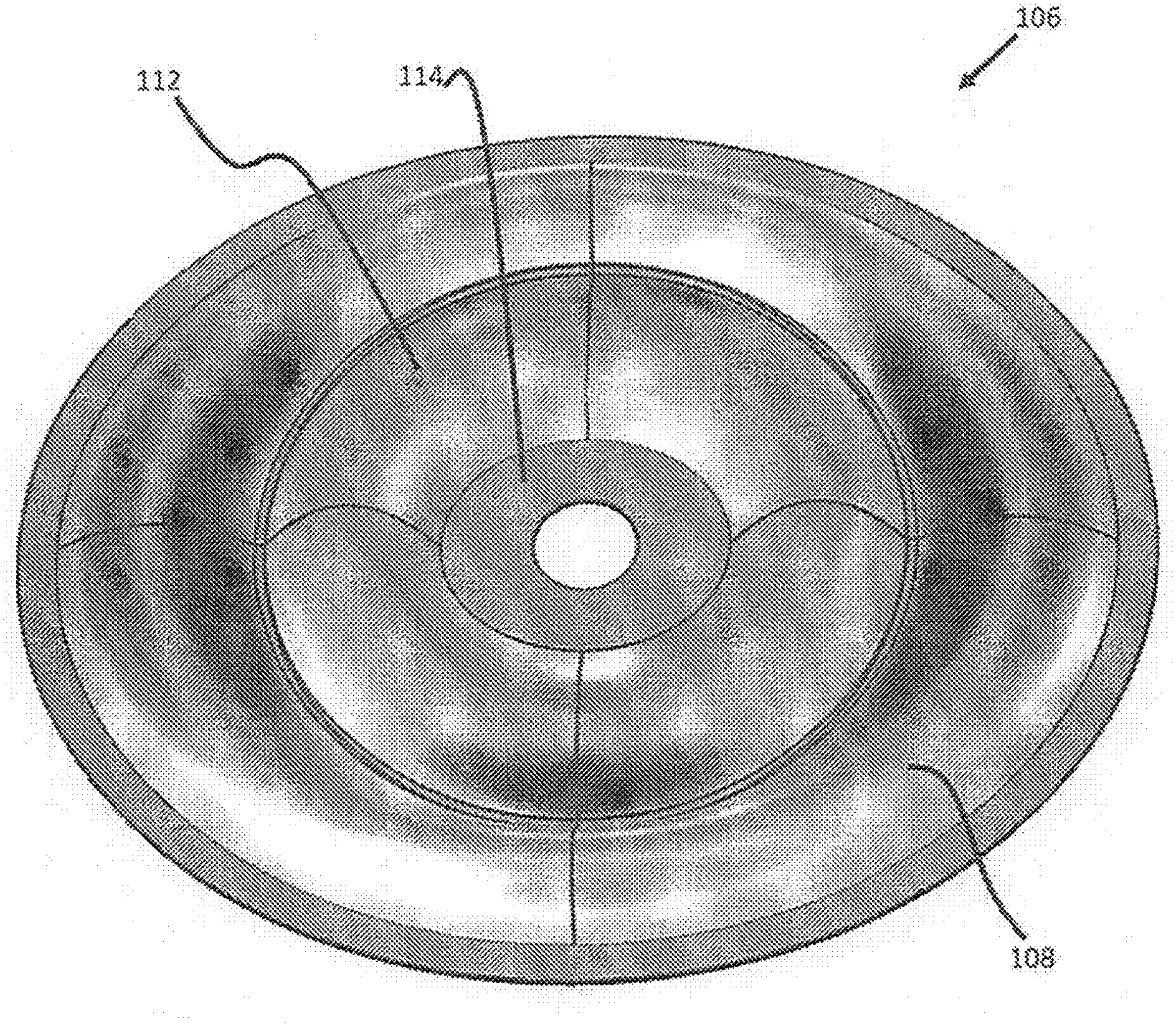
FIG. 2C is a perspective view of a modelling simulation result illustrating the weaker resonant modes in the Elliptical Ring Radiator Tweeter of FIGS. 2A and 2B (i.e., having varying non-uniform diaphragm suspension radial Chord lengths) and provides an exemplary view in the less uniform and more varied uniform gray areas around the circumference of the diaphragm segments which shows no single strong or dominant eigenmode that involves an entire diaphragm segment, in accordance with the method and structure of the present invention.

Since the outer and inner rolls 108, 112 are not axis-symmetric and have varying diameter dimensions (inside diameter to outside diameter) or radial Chord lengths, there is no one resonance frequency that fits either roll around its entire circumference (as in the view of prior art tweeter diaphragm of FIG. 1D); rather, since the geometry changes as the roll sweeps around the elliptical path, a variety of frequencies may create resonances but each frequency only fits over a small percentage of the diaphragm's surface area (e.g., as best seen in FIG. 2C). This means that instead of one strong resonance eigenmode being caused by the whole roll (e.g., 8, as seen in FIG. 1D) vibrating in sympathy with one frequency there is a wider range of frequencies causing smaller resonances whose individual effects are each much weaker and thereby have less of a deleterious effect on the performance of the tweeter of the present invention.

Each of the tweeter diaphragms of the present invention is preferably configured for use in a modified ring radiator style tweeter transducer having a motor incorporating a permanent magnet having an upper pole surface and a lower pole surface, an inner cylindrical voice coil gap, lumen or aperture around a central voice coil Z axis (e.g., 101), where the aperture is defined by an inner surface of the magnet (not shown, but similar to that shown in FIGS. 1A and 1B). Mounted on and in contact with the upper pole surface is an annular front plate which forms an upper pole piece for the motor. This front plate has a central lumen or aperture having a selected inner diameter defined by an inner circumferential edge or wall and has a thickness which defines a front plate axial length of the magnetic gap (which is centered beneath the voice coil attachment portion, e.g., 104 in FIG. 2A). For driver 100, the diaphragm segment roll height (RH, as best seen in FIG. 2B) is preferably 4 mm, but may be in the range of 2-6 mm.

Referring back to FIG. 2A, and particularly to the cross-section views for the short and long axes, the dimensions for the various portions are shown. In an exemplary embodiment, Elliptical ring radiator tweeter 100 has a nominal working diaphragm diameter of 15-30 millimeters ("mm"), and this comprises, for the long axis twice the first radial chord length of segment 108 (W1) plus twice the first radial chord length of segment 112 (W2) plus the long axis length of the central segment 114 (D1). A similar calculation along the short axis uses twice the second radial chord length of segment 108 (W3) plus twice the second radial chord length of segment 112 (W4) plus the short axis length of the central segment 114 (D2).

In table form, the ranges for each dimension and the preferred embodiment's dimensions (for diaphragm 106) are as follows:

TABLE 1

Elliptical Tweeter 100 Dimensions (in mm)
Range/Preferred Embodiment's Ideal

| | H | W1 | W2 | W3 | W4 | D1 | D2 |
|---|---|---|---|---|---|---|---|
| Const. | 2-6 | 3-12 | 2-10 | 2-10 | 3-12 | 3-8 | 2-7 |
| Roll Ht. | 4 | 8 | 5 | 5 | 8 | 6 | 4 |

Figure 2D:
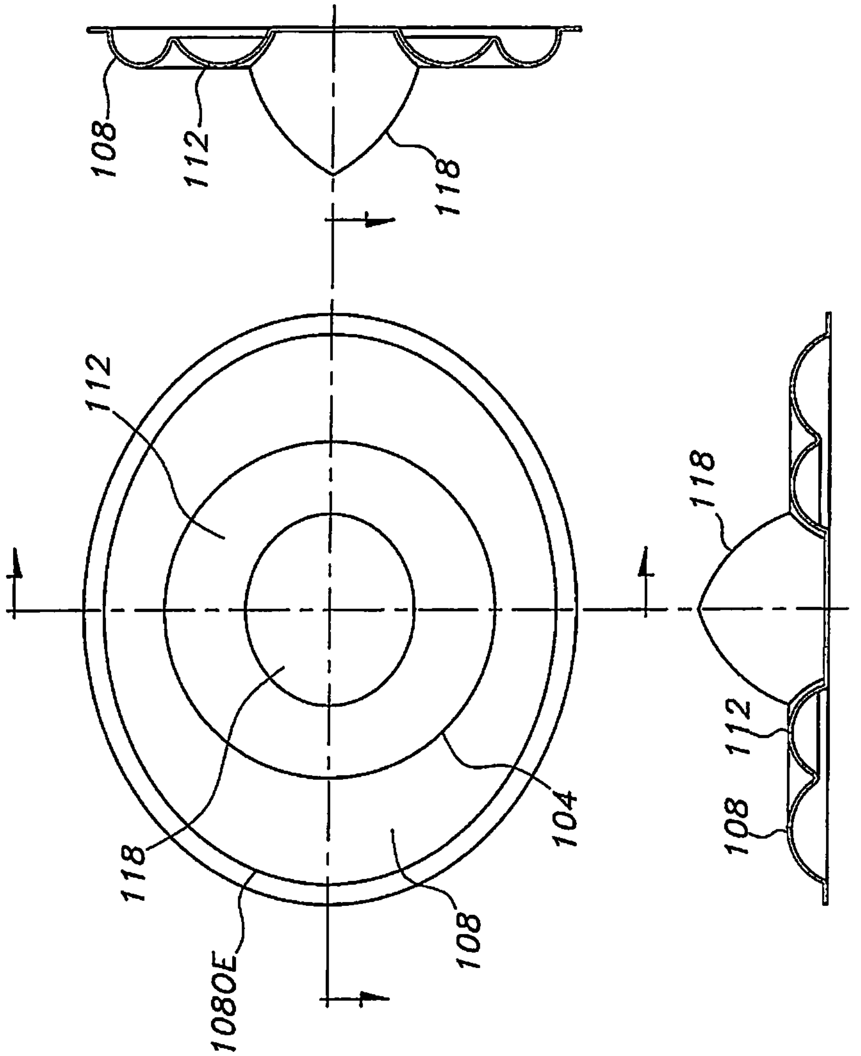
FIG. 2D is a plan view with a two-axis projection of the Elliptical Ring Radiator Tweeter driver and diaphragm of FIGS. 2A and 2B, but illustrates another embodiment having a distally projecting elliptical section waveguide member affixed upon or within the elliptical central opening and particularly illustrates the cross-section views for the short and long axes, in accordance with the method and structure of the present invention.

Referring next to FIG. 2B, speaker or driver assembly 100 is defined around a central axis 101 and has a magnet system with an annular air gap 102 for a voice coil assembly 104 connected to a loudspeaker diaphragm 106. The construction is comparable to prior art speakers (e.g., of FIGS. 1A and 1B), having an annular edge suspension 108 of annular ring domed or half doughnut surface shaped cross section connecting the voice coil assembly 104 with a surrounding chassis portion 110, and normally having the voice coil connected with the inner ring dome 112 having a retracted central, elliptical flat portion 114 which is rigidly secured to a central portion 116 of the driver motor assembly's fixed structure. An optional distally projecting waveguide feature (e.g., distally projecting elliptical section waveguide member 118, as best seen in FIG. 2D) may be mounted upon the central portion 116 of the driver motor assembly's fixed structure.

The improved performance of the resonance damping method of the present invention is illustrated by comparing FIG. 1D (illustrating the undesired strong eigenmodes in the traditional Ring Radiator Tweeter) with FIG. 2C (illustrating the scattered resonant modes in the Elliptical Ring Radiator Tweeter 100 of FIGS. 2A and 2B, which, in use, provides less audible resonant modes shown in the less uniform and more varied gray areas around the circumference of the diaphragm segments, with no single strong or dominant eigenmode that involves an entire diaphragm segment.

Figure 3A:
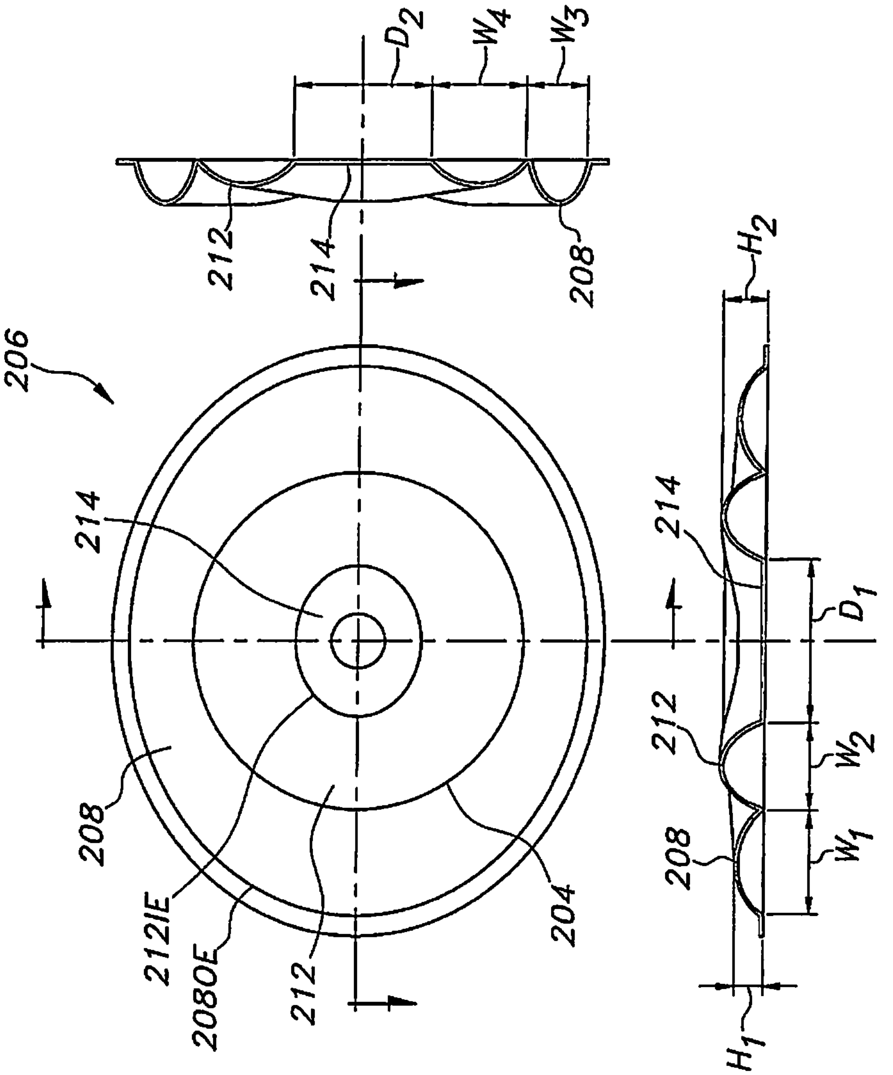
FIGS. 3A and 3B illustrate an embodiment of an Elliptical Ring Radiator Tweeter Diaphragm and Damping Method with inner and outer rolls of varying height, in accordance with the present invention.
Figure 3B:
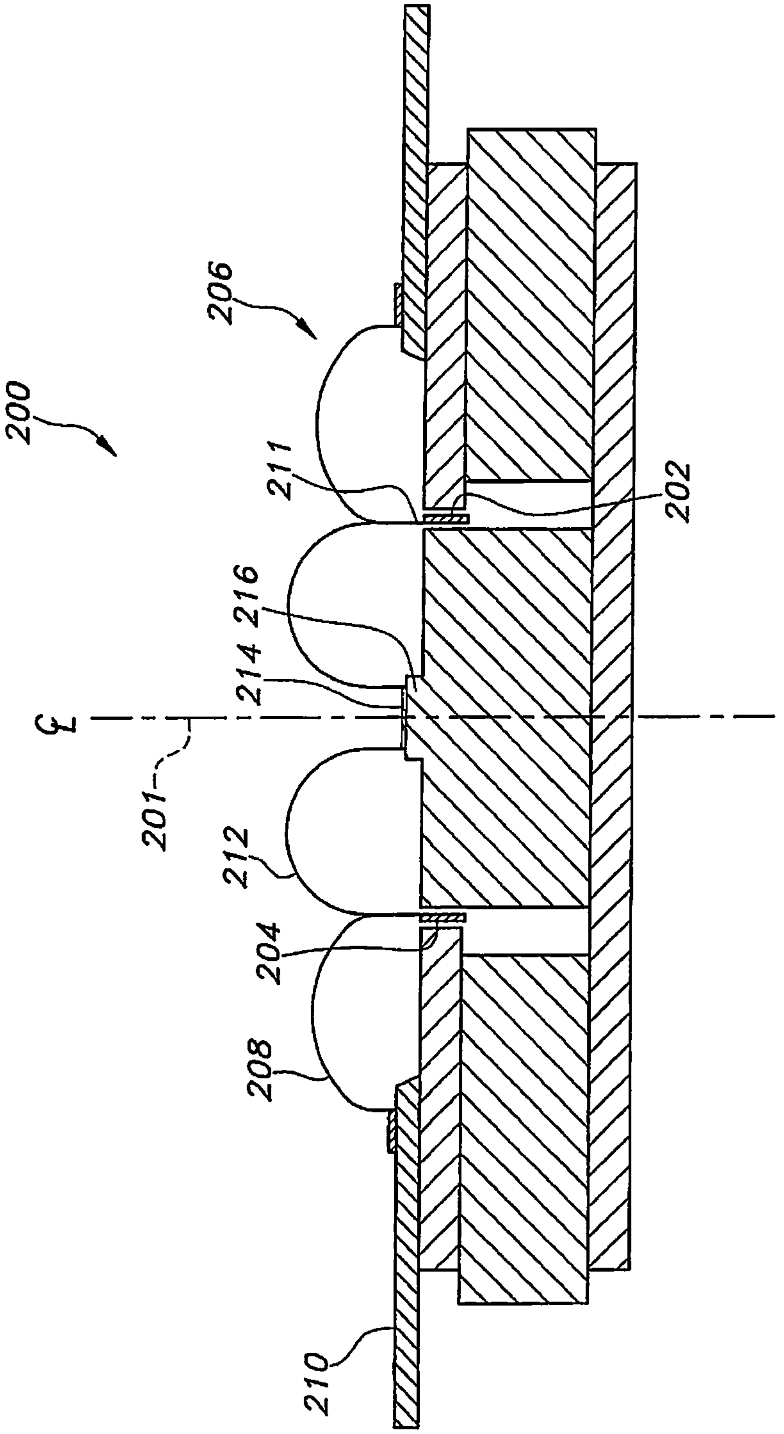

In the second embodiment of the present invention (200, as illustrated in FIGS. 3A and 3B) the arc-length of the outer and inner rolls 208, 212 varies as they sweep around the path to form the rolls This variation in arc-length has two desired effects; first, it keeps the excursion potential of the roll more consistent by insuring that at each radius there is a similar length of material; the second effect is that it provides another means of suppressing strong resonances by changing the height of the rolls (see, e.g., H1 and H2, best seen in the long axis cross sectional view in the two axis projection of FIG. 3A). By keeping the excursion potential around the diaphragm 200 relatively uniform, stiff spots at any point in the diaphragm that might otherwise cause instabilities in the desired linear motion of the diaphragm are minimized.

Referring now to FIG. 3B, speaker or driver assembly 200 is defined around a central axis 201 and has a magnet system with an annular air gap 202 for a voice coil assembly 204 connected to a loudspeaker diaphragm 206. The construction is comparable to prior art speakers (e.g., of FIGS. 1A and 1B), having an annular edge suspension 208 of annular ring domed or half doughnut surface shaped cross section connecting the voice coil assembly 204 with a surrounding chassis portion 210, and normally having the voice coil connected with the inner ring dome 212 having a retracted central, elliptical flat portion 214 which is rigidly secured to a central portion 216 of the driver motor assembly's fixed structure. An optional distally projecting waveguide feature (not shown) may be mounted upon the central portion 216 of the driver motor assembly's fixed structure.

Referring back to the two axis projection of FIG. 3A, and particularly to the cross section views for the short and long axes, the dimensions for the various portions are shown. In an exemplary embodiment, Elliptical ring radiator tweeter 200 has a nominal working diaphragm diameter of 15-30 millimeters ("mm"), and this comprises, for the long axis, twice the first radial chord length of segment 208 (W1) plus twice the first radial chord length of segment 212 (W2) plus the long axis length of the central segment 214 (D1). A similar calculation along the short axis uses twice the second radial chord length of segment 208 (W3) plus twice the second radial chord length of segment 212 (W4) plus the short axis length of the central segment 214 (D2).

In table form, here is the range of each dimension and the preferred embodiment's dimensions (for diaphragm 206):

TABLE 2

Elliptical Tweeter 200 Dimensions (in mm)
Range/Preferred Embodiment's Ideal

| | H1 | H2 | W1 | W2 | W3 | W4 | D1 | D2 |
|---|---|---|---|---|---|---|---|---|
| Var. | 2-4 | 3-7 | 3-12 | 2-10 | 2-10 | 3-12 | 5-8 | 3-7 |
| Roll Ht. | 3 | 5 | 8 | 5 | 5 | 8 | 6 | 4 |

Figure 4A:
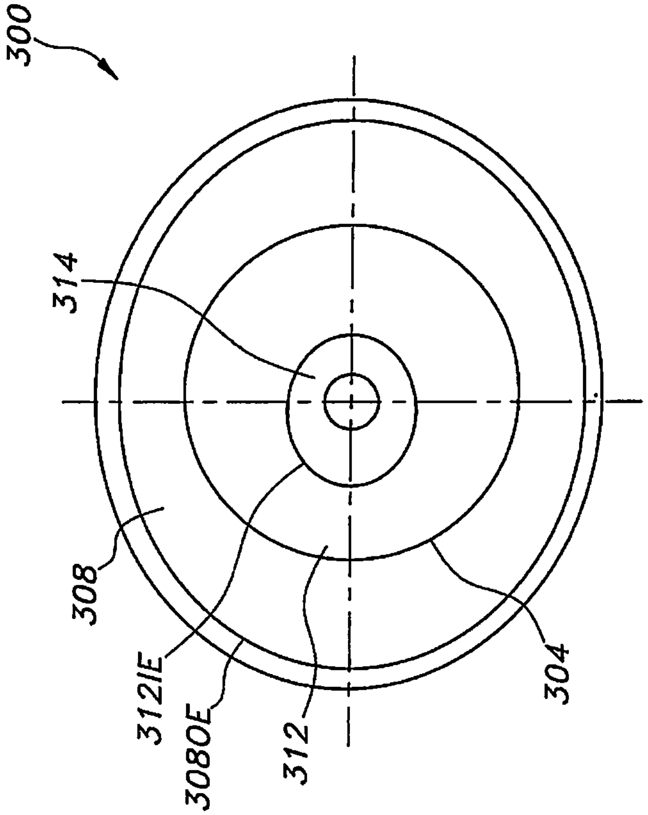
FIGS. 4A and 4B illustrate an embodiment of an Elliptical Ring Radiator Tweeter Diaphragm and Damping Method with a circular voice coil mounting position and inner and outer rolls defined around non-coaxial axes, in accordance with the present invention.
Figure 4B:
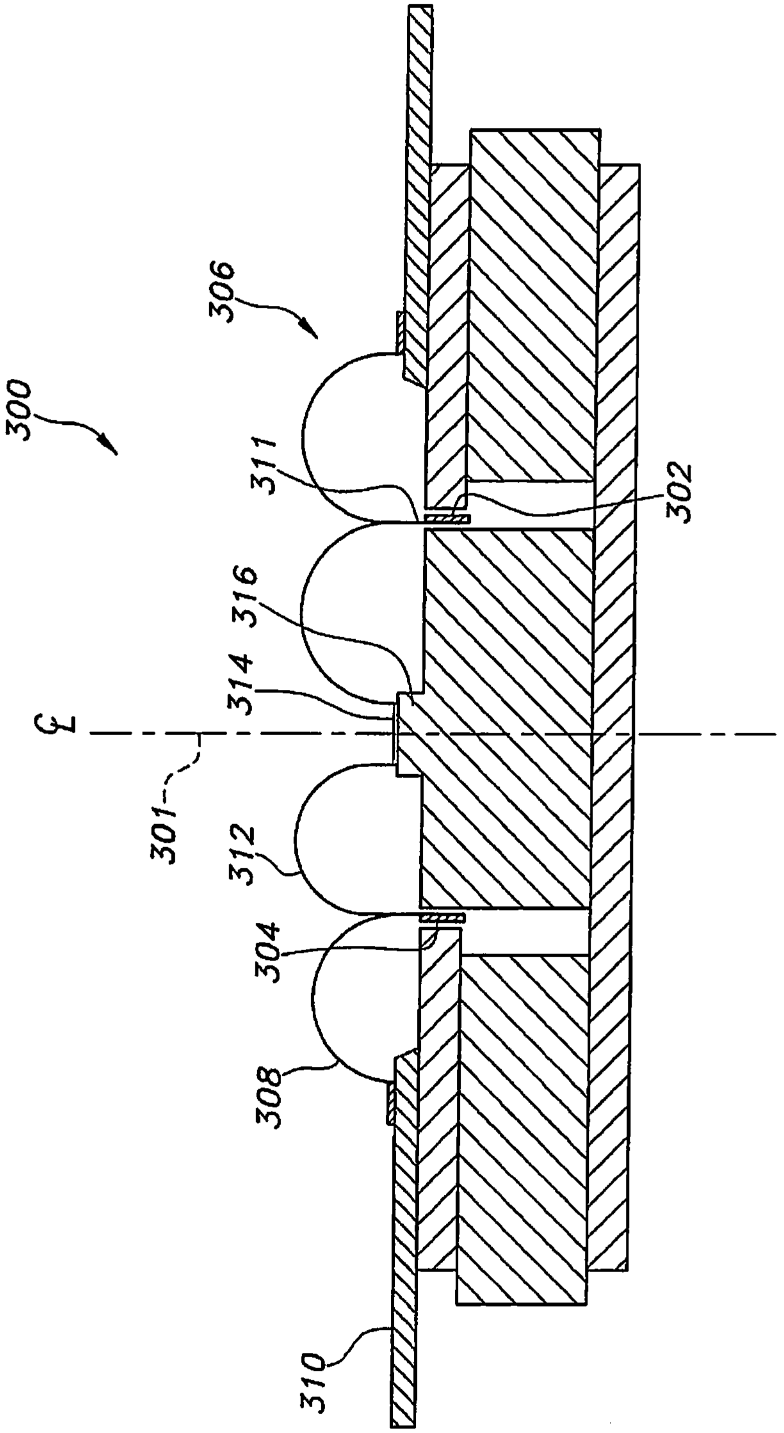

A third embodiment of the present invention (300, as illustrated in FIGS. 4A and 4B) differs from the embodiments described and illustrated above and modifies the position of the center axes of the voice coil attachment 304 and the rolls such as they are no longer coaxial with one another. By using different axes for the rolls 308, 312 and the voice coil attachment 304, further asymmetry is introduced into the system, leading to increased modal density and a decrease in strong modes. It is envisioned that a ring radiator tweeter that has different axes for the rolls and the voice coil attachment could be used with either rolls of constant cross section and height or rolls of varying height.

Referring next to FIG. 4B, speaker or driver assembly 300 is defined asymmetrically around first axis 301 and has a magnet system with an annular air gap 302 for a voice coil assembly 304 connected to loudspeaker diaphragm 306. The elliptically shaped edge suspension 308 has a half doughnut surface shaped cross section connecting the voice coil assembly 304 with a surrounding chassis portion 310, and has the voice coil assembly connected with the inner ring dome 312 having a retracted central, elliptical flat portion 314 which is rigidly secured to a central portion 316 of the driver motor assembly's fixed structure. An optional distally projecting waveguide feature (e.g., similar to distally projecting elliptical section waveguide member 118, as best seen in FIG. 2D) may be mounted upon the central portion 116 of the driver motor assembly's fixed structure.

Persons of skill in the art will appreciate that the present invention provides a loudspeaker transducer of the tweeter type having a chassis and a magnet system defining an annular air gap for a voice coil connected with a loudspeaker diaphragm (e.g., 106, 206 or 306), the loudspeaker diaphragm having a substantially outermost diaphragm portion which interconnects the voice coil at a voice coil attachment segment (e.g., 104, 204, 304) and the chassis that includes an annular, arch-profiled strip area, and having a first central elliptical (non-circular-shaped) central roll portion (e.g., 112, 212, 312) defining a central recessed area that is rigidly fixed to one of the magnet system and the chassis; wherein the loudspeaker also comprises a second, outer elliptical (non-circular-shaped) roll portion (e.g., 108, 208, 308) defining an outer area that is rigidly fixed to one of the magnet system and the chassis. Preferably, the central portion and the outer roll portion that have substantially elliptical edge circumferences with substantially circular central peripheral edges connecting to the voice coil former (e.g., at 104, 204, 304), and the roll height(s) preferably vary in such a manner as to keep the arc-length roughly the same so that the rolls, during excursion, have a motion that might be characterized as undulating around the central axis of the tweeter.

In an exemplary embodiment, a 25 mm ring radiator tweeter is configured with rolls that have substantially elliptical outer circumferences with substantially circular central peripheral edges connecting to the voice coil former (e.g., 104, 204). The roll height (e.g., RH) may be substantially constant or may vary (e.g. H1, H2) in such a manner as to keep the arc-length roughly the same so that the rolls, during excursion have a motion that might be characterized as undulating around the central axis of the tweeter. In this method of controlling the excursion of the tweeter, any break up modes are minimized and the associated resonances are minimized. In a preferred embodiment, a distally projecting waveguide member or bullet-nose shaped member projects distally along the central axis of the tweeter motor structure. For an elliptical surround embodiment of the tweeter of the present invention, a distally projecting bullet member (e.g. similar to distally projecting elliptical section waveguide member 118, as best seen in FIG. 2D) could also have a substantially elliptical cross section where the major and minor axes of the distally projecting bullet waveguide member are complementary to the major and minor axes of the diaphragm's outer periphery.

Persons of skill in the art will appreciate that the present invention makes available a loudspeaker driver or tweeter assembly including a diaphragm (e.g., 106, 206 or 306) having a substantially circular diaphragm portion which is connected with or rests upon a voice coil attachment segment (e.g., 104, 204, 304). The diaphragm also includes a first central elliptical (non-circular-shaped) inner roll portion (e.g., 112, 212, 312) defining a central recessed area nested within a second, outer elliptical (non-circular-shaped) roll portion (e.g., 108, 208, 308) defining an outer area, where each of the elliptical areas has (as shown in the two axis projections of FIGS. 2A, 2D and 3A) an elliptical major or long axis and a minor or short axis. As illustrated in the attached figures, the central portion and the outer roll portion each have substantially elliptical edge circumferences with substantially circular central peripheral edges connecting to the voice coil former or attachment segment (e.g., at 104, 204, 304) and thereby define a diaphragm with a varying radial Chord lengths across each diaphragm segment or non-uniform diameter dimensions (from inside diameter to outside diameter of each diaphragm segment). In selected embodiments (e.g., 200, best seen in FIGS. 3A and 3B) the inner and outer roll portions have selected varying roll height(s) which vary to keep the arc-length roughly the same so that the rolls, during diaphragm excursion, have a motion which is undulating around the central axis of the diaphragm. The diaphragm(s) of the present invention, when in use, have a controlled excursion such that any breakup modes are minimized and the associated resonances are minimized (see, e.g., FIG. 2C).

Any of the Elliptical Ring tweeter drivers described and illustrated above may optionally include a distally projecting waveguide member or bullet-nose shaped member which projects distally along a central axis of the diaphragm or driver (e.g., distally projecting elliptical section waveguide member 118, as best seen in FIG. 2D). For an elliptical surround embodiment, the distally projecting bullet member (e.g. 118 in FIG. 2D) preferably also has a substantially elliptical cross section where the long or major and short or minor axes of the distally projecting bullet waveguide member are complementary to the corresponding major and minor axes of the diaphragm's outer periphery. Optionally, the central roll or dome portion has a cross section that varies in profile and height (see, e.g., FIG. 3A) between the elliptical major axis and minor axis, and the diaphragm-facing contoured surface of the waveguide member is shaped to provide a substantially uniform gap between the diaphragm surface and the waveguide member underside surface.

Having described preferred embodiments of a new and improved tweeter diaphragm configuration and method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. A loudspeaker driver, comprising:

a chassis;

a magnet system connected to the chassis;

a voice coil operatively associated with the magnet system; and a diaphragm operatively associated with the voice coil, the diaphragm comprising:

a first portion having a first height that varies along a first continuous length of the first portion;

a second portion having a second height that varies along a second continuous length of the second portion; and wherein the first and second heights vary in such a manner as to produce an undulating motion around a central axis of the loudspeaker driver during excursion;

wherein the first portion has a substantially circular first outer edge and a non-circular first inner edge, and wherein the second portion has a substantially circular second inner edge and a non-circular second outer edge, and wherein the non-circular first inner edge comprises an elliptical first inner edge having a first major axis and a first minor axis, and wherein the non-circular second outer edge comprises an elliptical second outer edge having a second major axis and a second minor axis.

2. The loudspeaker driver of claim 1, wherein the first and second major axes are aligned with one another, and wherein the first and second minor axes are aligned with one another.

3. A loudspeaker driver, comprising:

a chassis;

a magnet system connected to the chassis;

a voice coil operatively associated with the magnet system; and a diaphragm operatively associated with the voice coil, the diaphragm comprising:

a first portion having a first height that varies along a first continuous length of the first portion;

a second portion having a second height that varies along a second continuous length of the second portion; and wherein the first and second heights vary in such a manner as to produce an undulating motion around a central axis of the loudspeaker driver during excursion; and wherein the first portion is positioned inside of the second portion.

* * * * *